United States Patent Office 3,069,366
Patented Dec. 18, 1962

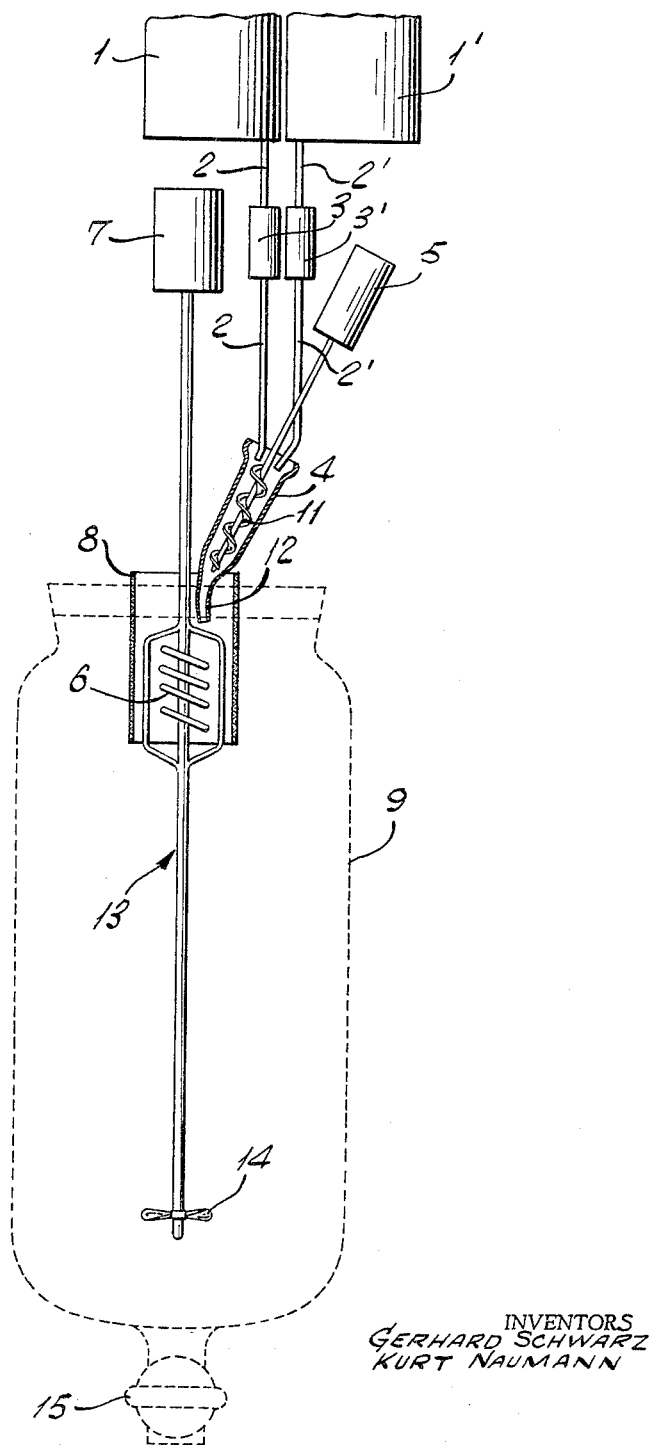
INVENTORS
GERHARD SCHWARZ
KURT NAUMANN

3,069,366
METHOD AND APPARATUS FOR PRODUCING SPHERICAL ION-EXCHANGE RESINS
Gerhard Schwarz, Sachsenwerkstrasse 64, Dresden A45, Germany, and Kurt Naumann, Marienberger Strasse 83, Dresden A21, Germany
Filed Aug. 5, 1958, Ser. No. 753,293
Claims priority, application Germany Apr. 1, 1958
1 Claim. (Cl. 260—2.1)

This invention relates to ion-exchange resins and has particular relation to a process and apparatus for producing ion-exchange resin particles of spherical or substantially spherical shape.

The terms "ion-exchange resins" and "resins" as used in this specification and the appended claim are deemed to embrace all ion-exchange resins that may be obtained in sphere form by condensations or polymerization and are not restricted to any particular kind of ion-exchange resins. They also include the rapidly condensing anion-exchanges on amine-basis.

The production of spherical ion-exchange resin particles is known in the art. In one of the known processes the reactants destined to form the ion-exchange resin are first partially condensed so as to form a liquid intermediate product, whereafter this intermediate product is hardened into resin spheres by a further time-controlled condensation under stirring and energy supply and azeotropic distillation of the reaction water.

In another process, which applies especially to synthetic resins on amine-basis, the intermediate product is maintained at a temperature of 0° C. and is subsequently supplied dropwise to a suspension medium under heating.

In yet another process of the prior art, a nozzle of particular construction is employed in order to obtain spheres of uniform size. Upon leaving the nozzle mouth, the partially condensed resin material in drop form hardens to resin spheres while traversing a relatively deep layer of suspension medium which latter should have a predetermined density and temperature gradient.

All the known processes require substantial expenditure with regard to time, energy, material and apparatus and do not lend themselves to continuous operation. Furthermore, concerning the second prior art process heretofore referred to, it is difficult to maintain the intermediate product for prolonged periods at a temperature of 0° C. This applies particularly to amine-resins. Moreover, the density of the suspension medium has to be adjusted in each particular case dependent on the nature and characteristics of the resin to be produced. In view of the drawbacks referred to, the known processes for producing ion-exchange resins of spherical shape have not met with practical success and have not been adopted by the industry in general. Most ion-exchange resins are consequently prepared in lump form. Lumpy ion-exchange resins in turn have the disadvantage that great losses in waste material are obtained upon comminuting the relatively large lumps to the desired grain or particle size.

In the light of the above considerations it is a primary object of this invention to provide a process by means of which ion-exchange resins of spherical or substantially spherical shape may be produced continuously and in an exceedingly simple manner requiring but a minimum of apparatus.

A further object of the invention resides in the provision of a process of the kind referred to, wherein any intermediate manufacturing step is eliminated and the resins are obtained in spherical shape of any predetermined size without incurring losses in material.

It is also an object of this invention to provide apparatus for producing spherically shaped ion-exchange resins.

A still further object of the invention is generally to improve on processes and apparatus for the production of ion-exchange resins of spherical shape.

Other objects and attendant advantages of the invention will become apparent from the following detailed description, particularly when read in conjunction with the accompanying drawing forming part of this specification, wherein the single FIGURE is a diagrammatical representation of an inventive apparatus for producing ion-exchange resins of spherical shape.

Briefly, in accordance with the inventive process, the liquid reactants destined to yield the resin are first mixed in the proper proportions and a stream of the mixture thus obtained is caused to flow into a vigorously agitated inert suspension medium, whereby the stream of the reaction mixture is broken up into small drops or droplets. The suspension medium is maintained at a temperature inducing the condensation or polymerization of the reaction mixture. The drops of the reaction mixture will thus solidify to form resin spheres.

In accordance with a preferred embodiment of the inventive process, the agitated suspension medium is divided into two zones, viz. a first more strongly agitated zone and a second less strongly agitated zone. The stream of reaction mixture is first conducted to said first zone wherein the drops are formed, whereafter the drops are conveyed to the second zone.

Referring now to the drawing, reference numerals 1, 1' indicate storage container means for holding the reactants to be employed in the manufacture of the resin. The apparatus here illustrated is intended for the production of resins which are obtained from two reactants, e.g. a diamine and formaldehyde. For this purpose, two storage containers 1, 1' have been shown, each of which contains one of the reactants. It will be realized, however, that in some instances it might be required to provide three or more containers while on the other hand it, sometimes, might be sufficient to provide a single one. The reactants are supplied to the storage containers 1, 1' in liquid form. If required, a suitable solvent may be added.

The reactants flow then from their respective containers 1, 1' through pipes 2, 2' and flow-controlling and measuring devices schematically indicated by reference numerals 3 and 3', respectively, into a mixing vessel 4, wherein the reactants are thoroughly mixed. For this purpose, a stirrer 11—which is preferably screw- or worm-shaped—is provided. The stirrer 11 is driven by the driving means or motor schematically indicated at 5. It will be understood that the rate of flow of the reactants into the vessel 4 may be easily controlled by properly adjusting the flow control means 3, 3', respectively, so as to obtain a reaction mixture of the required proportions.

The stirrer 11 not only thoroughly mixes the reactants but also tends to convey the mixture to the open snout or outlet 12 of the vessel 4. If the reaction mixture should be very viscous, it is of course feasible to facilitate the flow of the mixture through the outlet 12 by applying gas pressure or the like. Ordinarily, however, the gravity of the mixture will cause it to flow through the outlet 12.

The mixture flow thus through the outlet or snout 12 into the space defined by the relatively large receiving vessel 9.

The receiving vessel 9 contains a suspension medium, such as for example turbine-oil, o-dichlorobenzene or the like. It will be realized that the nature of the suspension medium will depend on the nature of the resin to be obtained. Generally speaking, however, the suspension medium should be a liquid that is chemically inert with regard to the reactants and the resin to be formed, that is immiscible therewith and that does not dissolve the resin. The suspension medium is maintained at a temperature most favorable for the polymerization or condensation of the reaction mixture. The heating means for maintaining the temperature have not been shown.

The suspension medium is strongly agitated by the stirring device, generally indicated by reference numeral 13. The driving motor is shown at 7. As will be seen, the stirring device 13 has a central stirring member 6 and a bottom stirring member 14. The stirring member 6 is surrounded by a screen 8 or the like. The distance between the outer extremity of the member 6 and the screen is rather short so as to obtain great turbulence in the suspension medium in the space defined by the screen. It will thus be apparent that the suspension medium confined within the screen 8 will be agitated more strongly than the suspension medium within the receiving vessel 9 proper and outside the screen 8. The suspension medium is thus efficiently divided into two communicating zones, the outer zone being less strongly agitated than the inner zone defined by the screen 8.

The reaction mixture flows through the outlet 12 into the strongly agitated first zone of the suspension medium, where the reaction mixture is broken up into drops. The inner walls of the screen 8 will, of course, facilitate the breaking up process due to impact action. The size of the drops is dependent on the size of the outlet mouth, the flow rate and the stirring intensity. Since the temperature of the suspension medium is kept at a value most favorable to the polymerization or condensation of the reaction mixture, such polymerization or condensation is immediately initiated. The drops thus solidify and harden into resins of spherical shape. The spheres, upon traversing the suspension medium within the screen 8 in a relatively short time collect at the bottom of the vessel 9.

We have ascertained that the division of the suspension medium into two stirring zones of the kind referred to considerably facilitates the formation of spheres, which are continuously formed and may be discharged from the bottom of vessel 9 through the outlet 15.

It will be realized that means may be provided for heating and for cooling the various elements of the apparatus, e.g. the storage containers, the various conduits and the flow control means.

It is, of course, also feasible to circulate the suspension medium depending on the manner in which the spheres are to be discharged. Further, a battery of several receptacles 9 may be provided with the suspension medium flowing in a closed circuit between them.

The inventive process will now be described by a specific example, it being understood, however, that this example is given by way of illustration rather than by way of limitation and that many alternations and changes may be effected in, for example, the choice of starting materials, quantities, temperatures and process conditions in general without departing in any way from the spirit and scope of this invention as recited in the appended claim.

*Example*

30.9 parts by weight of m-phenylenediamine are dissolved in the storage container 1 under stirring in 22.5 parts by volume of hydrochloric-acid of 32% concentration and 20 parts by volume of water. The mixture thus obtained is then cooled to room temperature. 62 parts by weight of formaldehyde of 30% concentration are introduced into the second storage container 1'. The two solutions flow then through the pipes 2, 2' and the measuring and flow control devices 3, 3', respectively, into the mixing vessel 4 at a flow speed corresponding to their ratio of volume. The mixing in the vessel 4 should in most instances be effected immediately prior to the introduction of the mixture into the suspension medium, so as to avoid condensation or polymerization before the mixture enters the suspension medium. A vigorous and intensive mixing of short duration takes place in the vessel 4. From the mixing vessel 4 the mixture flows into the receptacle 9 comprising the suspension medium which latter is heated to a temperaure of abou 70° C. The suspension medium may consist of, for example, turbine oil, o-dichlorobenzene or a similar inert substance. The stirring device 13 is rotated at such a speed that the stirring member 6 breaks up the stream of mixture into drops or spheres of the desired magnitude. The spheres condense or polymerize and settle in the bottom portion of the receptacle 9 and are continuously or discontinuously discharged, whereafter they are liberated from the suspension medium and are further processed in known manner.

It will be understood that our invention presents many important advantages. For example, production of the spherically shaped resin particles may be carried out directly and continuously without requiring an undesirable intermediate stage as is necessary in the prior art processes. Further, the size of the spheres may be readily controlled and adjusted. No waste is obtained and the requirements with regard to material, energy, time and expenditure in general are held down to a minimum.

Moreover, the resin spheres are obtained directly in the desired size, thus eliminating subsequent comminution which results in losses of material and dust formation. Spheres of uniform size, great stability and resistance to wear are obtained. As is commonly appreciated, spherically shaped ion-exchange resin particles are to be preferred in filter beds as compared to lumpy particles since the former offer less flow resistance. Moreover, in the event that the liquid to be subjected to the ion-exchanging treatment contains solid particles or other contaminations, these particles or contaminations deposit to a far less degree on spheres than on lumpy particles. The purification of filter beds comprising resin spheres is also much simpler.

What is claimed is:

A process for manufacturing an ion-exchange resin, comprising mixing formaldehyde with an aqueous acidic solution of m-phenylene-diamine at a temperature insufficient to cause polymerization of said mixture, introducing said mixture into a first zone containing an organic suspension medium inert to the reactants, maintaining said mixture in said zone with vigorous agitation at a temperature whereby spherical particles of an ion-exchange resinous condensation product are formed suspended therein, said vigorous agitation causing transfer of said spherical particles to a second zone containing the same suspension medium wherein agitation is less vigorous than in the first zone, and continuing said agitation and maintaining said temperature until condensation is complete and the ion-exchange spheres settle to the bottom of said second zone.

References Cited in the file of this patent

UNITED STATES PATENTS

| | | |
|---|---|---|
| 2,378,138 | Gaylor | June 12, 1945 |
| 2,502,490 | Sweet | Apr. 4, 1950 |
| 2,582,098 | Braithwaite | Jan. 8, 1952 |
| 2,582,849 | Ramondt | Jan. 15, 1952 |
| 2,596,930 | Kaiser | May 13, 1952 |
| 2,610,156 | Lundburg | Sept. 9, 1952 |
| 2,688,606 | Schmidt | Sept. 7, 1954 |
| 2,838,468 | Laurie | June 10, 1958 |
| 2,908,666 | Notarbartolo | Oct. 13, 1959 |

OTHER REFERENCES

Burk et al.: High Molecular Weight Organic Compounds, pages 1–3, Interscience (1949).